Patented June 13, 1944

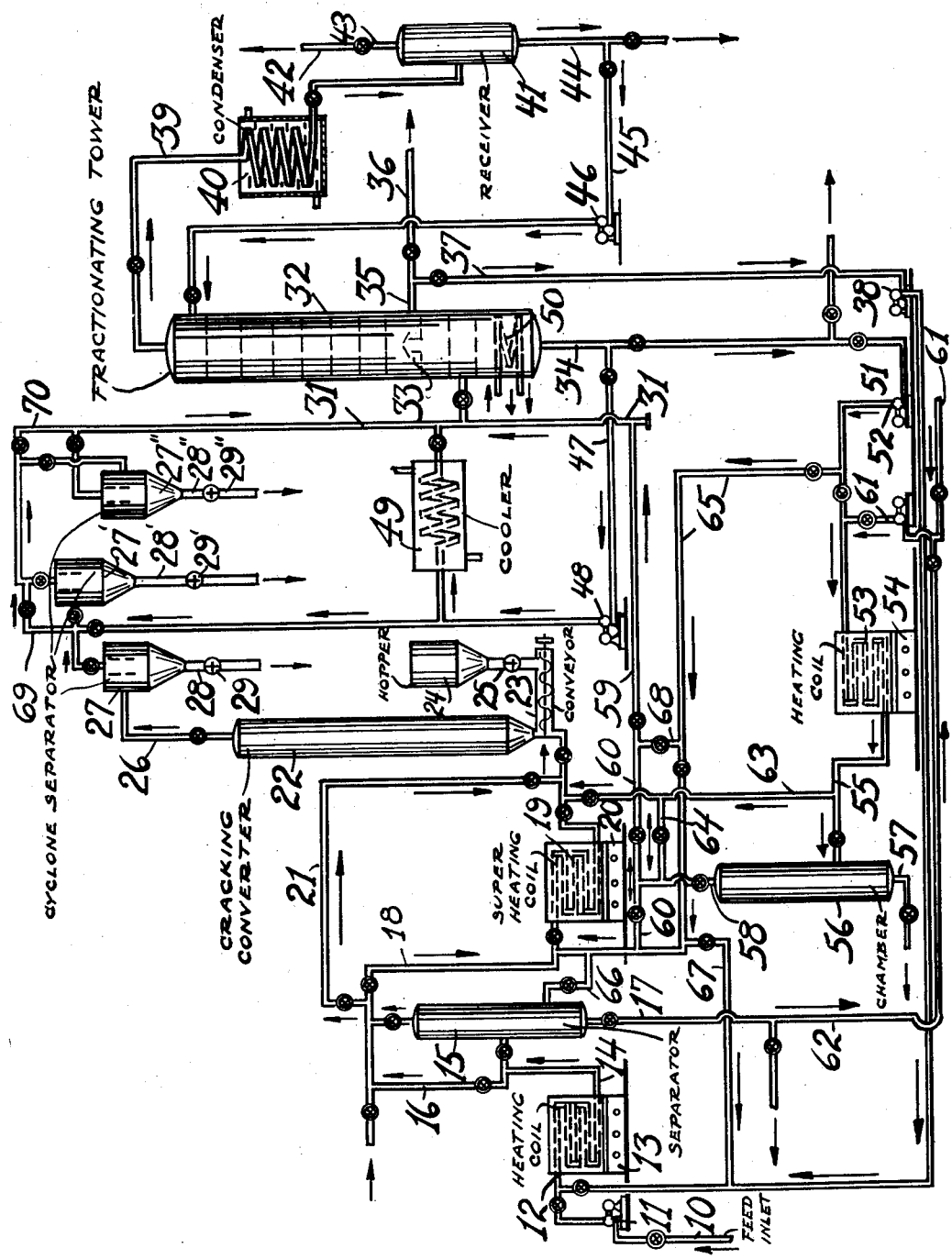

2,351,422

UNITED STATES PATENT OFFICE 2,351,422

CRACKING OF HYDROCARBON OIL

Edwin J. Gohr, Summit, N. J., assignor to Standard Oil Development Company, a corporation of Delaware Application April 9, 1940, Serial No. 328,651

7 Claims. (Cl. 196—52)

This invention relates to the cracking of hydrocarbon oils to form lower boiling motor fuel products and pertains more particularly to the cracking of hydrocarbon oil in the presence of a finely divided catalyst suspended in the oil to be cracked.

It has heretofore been proposed to catalytically crack hydrocarbon oil by suspending the catalyst in finely divided form in the oil stream to be cracked and passing the resulting suspension through a cracking zone. In some cases the catalyst is mixed with the oil in liquid form to form an oil-catalyst slurry and the resulting slurry passed through a vaporizing and cracking zone. In other cases, the oil is first vaporized and the catalyst is injected into the stream of oil vapors passing to the cracking zone. In either case the finely divided catalyst must eventually be separated from the cracked product. It is desirable in most cases to separate as much of the powdered catalyst from the cracked product as possible while the latter is in vapor form. As a practical matter however, it is difficult, if not impossible, in large scale operation to recover 100% of the catalyst from the oil vapor without any condensation of the latter since some of the extremely fine material remains entrained within the vapor and can not be readily removed. This material ultimately appears in the condensate formed by fractionating the cracked product.

It has heretofore been proposed to recover this material from the condensate by filtering the condensate and then distilling the filter cake to remove the oil and afterwards regenerating the catalyst. As a practical matter however, the cost of recovery makes this procedure more or less uneconomical.

One of the primary objects of the present invention is to provide an improved method of recovering finely divided catalytic material from the cracked product.

Another important object of the invention is to provide a method of carrying out catalytic reactions with finely divided catalytic material in which the catalyst can be more effectively utilized.

Other more specific objects of the invention will be apparent from the detailed description hereinafter.

In accordance with the present invention the finely divided catalytic material is first suspended in the oil stream and the resulting stream in vapor form and containing the catalyst suspended therein is passed through a conversion zone. The catalyst may be first mixed with the liquid oil and the resulting oil-catalyst slurry passed through a vaporizing zone or the oil may be first vaporized and the catalyst then introduced in dry state into the stream of oil vapors. In either case, the suspension of oil vapors and catalyst is passed through a cracking zone maintained at cracking temperature and the suspension is maintained within said zone for a length of time sufficient to obtain the desired conversion.

The resulting suspension of cracked products and powdered catalyst is passed through one or more solid-gas separators such as cyclone separators for removal of powdered materials therefrom. These solid-gas separators are preferably maintained at a temperature which will avoid any substantial condensation of cracked vapors during their passage therethrough. During the passage of the suspension through the separator the bulk of the powdered catalyst is separated in relatively dry state from the hydrocarbon vapors. The cracked vapor after passing through the solid-gas separator wherein the bulk of the powdered material is removed therefrom is then passed into a cooling zone wherein the temperature of the product is reduced to a point where a small fraction of the heavy oil vapors is condensed. This cooling may be accomplished in a heat exchanger, fractionating, or baffle tower wherein condensate formed during the cooling serve as a washing medium for removing the final traces of catalyst from the oil stream. When operating in this manner, the first condensate fraction, which may amount to from 1 to 20% of the total vapors will contain the catalyst entrained in the oil vapors leaving the separator. This fraction is segregated from the remainder of the cracked products.

In accordance with one phase of the present invention, the heavy condensate fraction so segregated and containing the entrained catalyst therein is subjected to further cracking in the same or different cracking unit. For example, this fraction may be subjected to separate cracking under conditions such as to form a substantial amount of gasoline as a final product or under conditions controlled to produce a gas oil for further catalytic cracking with a minimum conversion into gasoline. This condensate containing the residual catalyst may be cracked by itself or it may be mixed with other feed. Moreover, additional catalytic material may be added to the oil. However, this fraction may be recycled to the same cracking zone or separately vaporized and then recycled to the same cracking zone.

Having set forth the general nature and objects, the invention will be better understood by reference to the accompanying drawing which is partially schematic and partially diagrammatic illustration of an apparatus suitable for carrying the invention into effect.

Referring to the drawing, the reference character 10 designates the charge line through which the oil to be cracked may be introduced into the system. This oil may comprise for example a clean condensate stock such as virgin gas oil or a residual stock containing unvaporizable constituents.

The oil introduced in the system through line 10 is forced by means of pump 11 to a heating coil 12 located in the furnace 13 in which it is heated to a temperature sufficient to vaporize a substantial amount of the oil. If desired, a vaporizing medium, such as steam or other stripping gas may be introduced into the heating coil 12 to assist in vaporizing the oil.

The oil after passing through the heating coil 12 is transferred by means of a transfer line 14 leading to a separator 15 in which oil vapors are separated from unvaporized residue. In cases where the feed stock is a substantially completely vaporizable oil the separator 15 may be omitted or the product from the heating coil 12 by-passed around the separator through line 16.

Residue separated in the separator 15 is withdrawn therefrom through line 17 and may be rejected from the system or treated as later described. Vapors liberated in separator 15 pass overhead therefrom through line 18 and may be passed through a superheating coil 19 located in furnace 20 to further heat the oil to the desired reaction temperature. In cases where a clean condensate stock is employed as a feed stock to the cracking unit, the oil may be heated in coil 12 to the desired reaction temperature. In such case, the superheater 19 may be omitted or the oil by-passed around the superheater through line 21 and passed directly to a cracking converter 22.

In accordance with the present invention there is injected into the oil vapors passing to the converter 22 a finely divided cracking catalyst in an amount sufficient to obtain the desired catalytic effect. The relative amount of catalyst introduced into the oil stream will depend upon a number of factors such as the nature of the stock to be cracked, the activity of the catalyst, temperature of the cracking zone, the time of contact of the oil vapors within the reaction zone, etc. In general the amount of catalysts may vary between .5 part of catalyst per part of oil to 10 parts of catalyst per part of oil.

The catalyst employed may be any desired cracking catalyst in finely divided form such as for example naturally active or activated clays and synthetic compounds having similar chemical components. Any suitable means may be provided for injecting the powdered material into the oil stream. As illustrated, there is shown a screw conveyor 23 for feeding the catalyst into the line leading into the converter. The catalyst from the hopper 24 may be fed into the screw conveyor at any desirable rate by a suitable feeding mechanism such as a star feeder 25.

The oil vapors containing the finely divided catalyst in suspension therein are passed through the converter 22 at a velocity sufficient to maintain the catalyst in suspension within the vapors. It is not essential to the present invention that the resident time of the catalyst and oil vapors within the converter 22 be the same. The density of the suspension may be such that the catalyst travels at a slower rate through the reaction zone than the oil vapors.

The converter may be of any suitable design capable of maintaining the material in suspension such as a vertical tower as illustrated or an elongated coil either heated or unheated.

After passing through the converter 22 the cracked product containing the catalyst in suspension therein is transferred through line 26 to a suitable solid-gas separating equipment. Such separating equipment may comprise for example three cyclone separators 27, 27' and 27" arranged in series. The separators are preferably maintained at a temperature which will avoid any condensation of the cracked vapors during their passage therethrough. Powdered catalyst separated in the separators is removed through conduits 28, 28' and 28" having suitable sealing mechanism capable of maintaining a pressure seal such as a star feeder 29, 29' and 29". The catalyst so separated will normally be contaminated with carbonaceous deposits formed during the cracking operation. This catalyst is preferably regenerated by burning off the carbonaceous deposit in any suitable equipment and the regenerated catalyst is then returned to the hopper 24 for further use.

The cracked vapors having the bulk of the powdered material removed therefrom in the separators 27, 27' and 27" but still containing substantial amounts of entrained particles are then passed through line 31 to the lower section of a fractionating tower 32 wherein the vapors are subjected to cooling and fractionation to condense insufficiently cracked constituents thereof.

The fractionating tower 32 may be of any suitable construction capable of bringing about fractional condensation such as for example a bubble tower.

In accordance with the present invention, there is segregated from the cracked vapors undergoing fractionation in the fraactionating tower 32 an initial heavy condensate fraction such as for example a condensate boiling about 700°. This condensate contains any residual catalyst which may be entrained in the oil vapor leaving the final separator 27".

In order to segregate heavy condensate fraction from the remainder of condensate formed in the tower the fractionating tower 32 is provided with a trap-out tray 33 which collects condensate formed in the upper section of the tower. The heaviest condensate containing the entrained catalyst is withdrawn from the bottom of the tower through line 34 and is treated as hereinafter described.

Condensate formed in the upper section of the tower 32 above the trap-out tray 33 is removed therefrom through line 35. This product may be withdrawn from the system through line 36 or recycled through line 37 and pump 38 to the inlet side of heating coil 12 for further cracking treatment.

Vapors remaining uncondensed in the fractionating tower 32 and containing the desired distillate are removed overhead through line 39 which passes to a condenser 40 in which the desired liquid distillate is condensed. Products from the condenser 40 may be passed through a receiver 41 in which the liquid distillate condensed in the condenser 40 separates from the normally gaseous products formed in the cracking operation. The gaseous products may be vented from the receiver 41 through line 42 having a valve 43 for imposing the desired back pressure on the system. Liquid distillate forming the final product of the process is withdrawn from the receiver 41 through line 44 and may be subjected to any further finishing treatment desired for the production of a final, stable and marketable product. If desired, a portion of the distillate formed may be returned through line 45 and pump 46 to the top of fractionating tower 32 as reflux medium therefor.

In accordance with the present invention, the heaviest condensate fraction removed from the bottom of the fractionating tower 32 and containing a substantial amount of powdered catalyst therein is subjected to further treatment as hereinafter described.

According to one mode of operation a part or all of the heavy condensate from line 34 may be returned through line 47 and pump 48 to the vapor line leading to the secondary and tertiary separators 27' and 27''. The condensate so returned will be revaporized by the heat of the cracked vapors and the catalyst will be recovered in the secondary and tertiary separators.

If desired a portion of the condensate may be passed through a cooler 49 and then injected into the stream of oil vapors passing to the fractionating tower to serve as a cooling medium to reduce the temperature of the vapors. If desired a cooling coil 50 may be provided in the bottom of the tower to provide the necessary amount of cooling to form the desired amount of condensate.

As a further phase of the invention, the heavy condensate withdrawn through line 34 may be passed through line 51 and pump 52 to the inlet side of a heating coil 53 located in furnace 54. Conditions within the furnace 54 may be controlled to attain a substantial cracking of such oil into motor fuel during its passage therethrough, or it may be controlled so as to effect a mild viscosity breaking of said oil to form additional cracking stock for catalytic cracking.

The products from the coil 53 pass through line 55 to a chamber 56 which may serve as a liquid separator or as a coking vessel. The oil introduced into chamber 56 separates into vapors and unvaporized residue containing the catalyst. Liquid residue may be withdrawn continuously or intermittently from chamber 56 through line 57 or as previously described the residue may be maintained in the vessel 56 until converted to solid coke residue. In the latter case a plurality of coking vessels 56 may be arranged in parallel so that the coke can be removed from the individual vessels without interrupting the process.

Vapors liberated in the chamber 56 are removed overhead through line 58 and may be passed through line 59 to the fractionating tower 32 for fractionation. For simplicity a single fractionating tower is shown for fractionating products from the vapor phase catalytic cracking zone 22 and the cracking coil 53. In many cases, however, it is desirable to provide separate fractionating equipment so that products produced from each unit may be segregated.

In other cases the vapors may for example pass through lines 58 and 60 to the inlet side of the superheating coil 19 located in furnace 20 wherein they may be combined with the fresh feed being heated therein.

If desired, fresh oil from an extraneous source or a slurry of oil and catalyst may be introduced into line 51 through line 61 and treated along with the heavy condensate passing to coil 53. For example, residue from the separator 17 may be passed through lines 62 and combined with heavy condensate passing to coil 53.

According to a further phase of the invention, the products from the heating coil 53 without passing through the separator 56 may be passed directly through line 63 and merged with the fresh oil feed passing to the cracking converter 22 or the overhead from chamber 56 may be passed through lines 54, 64 and 63 to converter 22.

As a further alternative the heavy condensate containing the entrained catalyst rather than being subjected to separate heating or cracking treatment, before merging with the stream of fresh feed may be recycled directly to various points in the fresh feed circuit. For example, a part or all of the heavy condensate from line 51 rather than passing through the heating coil 53 may be passed through lines 65 and 66 to the separator 15 wherein it will combine with fresh feed from the heating coil 12. As another modification the heavy condensate may be passed through lines 65 and 67 and merged with fresh feed prior to being introduced into the heating coil 12, or as a further alternative such heavy condensate may be passed through lines 65, 68 and 60 to the inlet side of the superheating coil 19. In case all the heavy condensate from the fractionating tower is recycled to the same cracking circuit the coil 53 and separator 56 may be omitted or it may be employed for cracking an extraneous feed of viscosity breaking crude residue from separator 15.

In accordance with the present invention the catalyst contained in the heavy condensate stock formed in the bottom of the fractionating tower 32 is employed for further cracking treatment without attempt to separate such catalyst from the cycle oil. The amount of catalyst contained in the heavy condensate in the bottom of the fractionating tower 32 may be controlled by regulating the amount of powdered catalyst removed in the dry separators 27, 27' and 27''. The amount of catalyst withdrawn from the system in dry form for regeneration may be controlled for example by providing by-pass lines 69 and 70 around cyclone separators 27' and 27''.

The present invention, therefore, contemplates a process in which the amount of cracking accomplished by the catalyst between regenerations can be controlled within limits. For example, if it is desired to pass the catalyst through the cracking zone on the average of one and one-half times between regenerations the amount of dry catalyst removed by the cyclone separator will be about half of that introduced into the cracking zone. The other half will be returned to the cracking zone with the cycle stock.

For simplicity the initial heavy condensate from the cracking operation has been described as formed in the bottom section of the main fractionating tower 50. It will be understood, however, that two separate towers may be provided for segregating the condensates or the initial condensate may be formed in an intermediate condenser in the line leading to the fractionating tower.

Having described the prepared embodiment of the invention, it will be understood that it embraces such other variations and modifications as come within the scope and spirit thereof. What is desired to be protected by Letters Patent is:

I claim:

1. In the cracking of hydrocarbon oils to form lower boiling motor fuel products wherein a cracking catalyst in finely divided state is suspended in a stream of oil to be cracked and the stream is passed in vapor form through a cracking zone maintained at cracking temperatures, the improvement which comprises separating the bulk of the finely divided catalyst from the cracked products while the latter are in the vapor state, thereafter segregating from the cracked products a motor fuel fraction and a high boiling condensate fraction containing the remainder of the finely divided catalyst suspended therein, subjecting the higher boiling condensate fraction to mild cracking treatment, combining products from said last named mild cracking treatment with said first named stream of oil prior to passing the same through said first named cracking zone.

2. A process for cracking hydrocarbon oils which comprises vaporizing the oil to be cracked, passing the oil vapors through a cracking zone maintained at cracking temperature, mixing a finely-divided cracking catalyst with the oil vapors passing through the cracking zone to form an oil vapor-catalyst suspension, passing the oil vapor-catalyst suspension from said cracking zone to a separating zone, separating the bulk of the finely-divided catalyst from the cracked vapors in said separating zone, thereafter fractionating the cracked vapors to form a high boiling condensate fraction containing residual finely-divided catalyst not removed from said oil vapors in said separating zone, combining said high boiling condensate fraction with the cracked vapor-catalyst suspension passing through said separating zone and segregating a motor fuel fraction from the cracked vapors undergoing fractionation.

3. A process for cracking hydrocarbon oils which comprises vaporizing the oil to be cracked, passing the oil vapors through a cracking zone maintained at cracking temperature, mixing a finely-divided cracking catalyst with the oil vapors passing through the cracking zone to form an oil vapor-catalyst suspension, passing the oil vapor-catalyst suspension from said cracking zone to a separating zone wherein the bulk of the finely-divided catalyst is separated from the cracked vapors, passing the cracked vapors from said separating zone to a fractionating zone, fractionating the vapors in said fractionating zone to form a high boiling initial condensate fraction containing residual catalyst not removed in said separating zone, withdrawing said high boiling initial condensate fraction from said fractionating zone, combining a portion of said condensate fraction so withdrawn with the oil vapor-catalyst suspension passing through said separating zone, cooling the remaining portion of said high boiling condensate fraction so withdrawn, combining the cooled fraction with cracked vapors passing to the fractionating zone and segregating a motor fuel fraction from the cracked products undergoing fractionation.

4. A process for the conversion of hydrocarbon oils which comprises contacting the oil vapors while at active conversion temperature with a finely divided conversion catalyst, maintaining said oil vapors in contact with said finely divided conversion catalyst for a period sufficient to obtain a substantial conversion thereof, thereafter separating a major portion of the finely divided conversion catalyst from the vaporous conversion products, thereafter cooling the vaporous conversion products containing a minor amount of unseparated catalyst to a temperature below the condensation point of the higher boiling constituents of said conversion products to form an initial condensate therefrom containing said unseparated catalyst, cooling a portion of said initial condensate so formed, intermixing the cooled condensate containing said unseparated catalyst with said last-named conversion products to effect said cooling and subjecting at least a portion of said initial condensate containing said unseparated catalyst to further conversion.

5. A process for the conversion of hydrocarbon oils which comprises contacting the oil vapors while at active conversion temperature with a finely divided conversion catalyst, maintaining the oil vapors in contact with said finely divided conversion catalyst for a period sufficient to obtain a substantial conversion thereof, thereafter separating a major portion of the conversion catalyst from the vaporous conversion products, thereafter cooling the vaporous conversion products containing a minor amount of unseparated catalyst to a temperature below the condensation point of the higher boiling constituents thereof to form an initial condensate containing said unseparated catalyst, cooling a portion of the initial condensate so formed, intermixing the cooled condensate containing said unseparated conversion catalyst with said last-named vaporous conversion products to effect said cooling thereof and combining at least a portion of said initial condensate containing said unseparated conversion catalyst with said first-named oil prior to contacting the same with said conversion catalyst.

6. A process for the conversion of hydrocarbon oils which comprises passing a restricted stream of said oil through an elongated heating zone, heating said oil during passage through said zone to a temperature above the vaporizing temperature thereof, thereafter passing the vapors so formed through a conversion zone, contacting the vapors within said conversion zone with a finely divided conversion catalyst while at conversion temperature, maintaining the oil vapors in contact with said conversion catalyst for a period sufficient to obtain a substantial conversion thereof, thereafter separating a major portion of the finely divided conversion catalyst from the vaporous conversion products, thereafter cooling the conversion products to a temperature below the condensation point of the higher boiling constituents thereof to form an initial condensate containing a minor portion of unseparated finely divided catalyst, cooling a portion of said initial condensate and recombining it with said vaporous conversion products subsequent to the removal of said major portion of finely divided conversion catalyst as a cooling agent therefor, and combining at least a portion of the initial condensate containing said unseparated catalyst with said oil prior to passing the same through said first-named heating zone.

7. A process for the conversion of hydrocarbon oils which comprises passing the oil in a restricted stream through an elongated heating zone, heating the oil during its passage through said zone to a temperature conditioned to vaporize a substantial portion thereof, thereafter separating the vapor from unvaporized residues, further heating the vapors so separated to the desired conversion temperature, passing the last-named heated vapors through a conversion zone, contacting said vapors within said conversion zone with a finely divided conversion catalyst while at a temperature sufficient to obtain a substantial conversion thereof, thereafter separating a major portion of said finely divided conversion catalyst from the vaporous conversion product, thereafter cooling the vaporous conversion product to a temperature below the condensation point of the higher boiling constituents thereof to form an initial condensate containing unseparated catalyst and combining said initial condensate containing said catalyst with the oil vapors following the separation from the unvaporized residue and prior to further heating of said vapors to the desired reaction temperature.

EDWIN J. GOHR.